Nov. 19, 1929.   I. B. BJORNSON   1,736,479
COOKING VESSEL
Filed Aug. 10, 1928
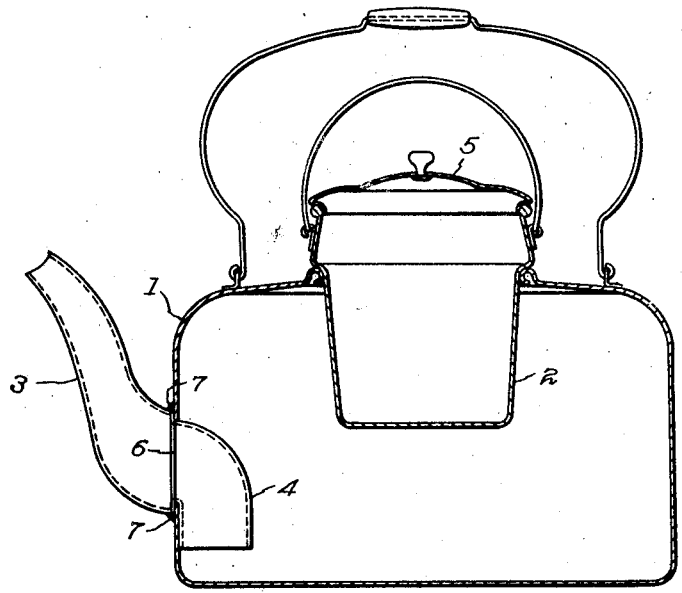
INVENTOR
Ingvard B. Bjornson
By Archworth Martin,
Attorney.

Patented Nov. 19, 1929

1,736,479

UNITED STATES PATENT OFFICE

INGVARD B. BJORNSON, OF NEW KENSINGTON, PENNSYLVANIA, ASSIGNOR TO THE ALUMINUM COMPANY OF AMERICA, OF PITTSBURGH, PENNSYLVANIA, A CORPORATION OF PENNSYLVANIA

COOKING VESSEL

Application filed August 10, 1928. Serial No. 298,801.

My invention relates to cooking utensils, such as tea kettles, double boilers, coffee pots, percolators, etc., of the type commonly provided with a pouring spout.

One object of my invention is to provide a vessel having a pouring spout and means in the vessel for sealing off communication between the surface of liquid contained therein and the spout, except at extremely low liquid levels.

Another object of my invention is to simplify and improve generally cooking vessels of the type referred to.

One manner of practicing my invention is shown in the accompanying drawing wherein the figure is elevational sectional view of a vessel constructed according to my invention.

Referring to the drawing, 1 indicates a tea kettle of somewhat the ordinary type, having an opening in its top that is normally closed by a lid, but which is herein shown as serving as a support for a cooking vessel 2, the kettle 1 and the vessel 2 together forming what is generally termed a double boiler. The lid 5 is adapted to close an opening in the vessel 2 and is also adapted to close the opening in the kettle 1 when the vessel 2 is not used.

The usual opening is provided in the side wall of the kettle and a spout 3 is welded or otherwise secured in position. A second spout member or hood 4 that is preferably cylindrical in cross-section is provided with a flange 6 lying against the outer surface of and welded to the vessel, or held in position by abutting engagement of the spout and the welding metal 7, and forms with the spout member 3 a continuous conduit or spout. The spout members 3 or 4 may be formed integral, if desired, and welded in the position shown in the drawing.

The utility of the inner spout member or hood 4 rests in the fact that it extends downwardly to a point below the opening through the side wall of the kettle, so that when the level of the body of liquid within the kettle is above the lower end of the hood 4, steam from the surface of the liquid will not be discharged through the spout 3, the only steam passing therethrough being that from the relatively small surface of liquid contained within the hood 4.

By reason of this arrangement not only is the presence of excessive steam within the room or kitchen avoided, but there is conservation of heat which would otherwise escape through the spout, also reduction in the evaporation of the liquid in the form of steam through the spout 3.

Again, less water is required to render the double boiler effective than if the hood 4 were omitted, since the body of water need extend only to a point slightly above the lower edge of the hood 4. This small body of water obviously requires less heat to bring it to a desired temperature than if a volume of water were employed whose level extends up to or above the opening in the kettle wall for the spout 3, and less heat is required to maintain the smaller body of water at cooking temperatures.

Another advantage arises from the fact that the kettle will boil dry less rapidly, and when the volume of water reaches the danger point—below the lower end of the hood 4—a larger volume of steam will immediately issue from the spout 3, thus warning the user that more water should be placed in the kettle. Also, particularly if a lid is in place upon the kettle instead of the receptacle 2, and the water in the kettle is at boiling point, the lid will ordinarily vibrate or rattle if the water level is above the lower end of the hood 4, whereas when the water level reaches a plane below the hood and the steam pressure escapes through the spout 3, the vibration of the lid will cease, thus warning the user that the water level in the kettle has reached a dangerously low point.

I claim as my invention:

1. The combination with a vessel having a spout opening in one wall thereof, of a spout member disposed interiorly of the vessel but having an end extending outwardly through the opening, a flange on said end, and a spout member disposed against the said flange and welded to the vessel.

2. The combination with a vessel having a spout opening in one wall thereof, of a spout member disposed interiorly of the vessel but having an end extending outwardly through the opening, a flange on said end, lying against the outer wall of the vessel, and a spout member welded to said outer wall by metal deposited circumferentially of said flange.

In testimony whereof I, the said INGVARD B. BJORNSON, have hereunto set my hand.

INGVARD B. BJORNSON.